US008267336B2

(12) United States Patent
Goldmann et al.

(10) Patent No.: US 8,267,336 B2
(45) Date of Patent: *Sep. 18, 2012

(54) SYSTEM AND METHOD FOR TREATING SHREDDER RESIDUES AND USE OF A GRANULATE FRACTION THUS PRODUCED

(75) Inventors: Daniel Goldmann, Goslar (DE); Bram den Dunnen, Graunschweig (DE); Michael Knust, Isenbüttel (DE)

(73) Assignee: Volkswagen AG, Wolfsburg (DE)

( * ) Notice: Subject to any disclaimer, the term of this patent is extended or adjusted under 35 U.S.C. 154(b) by 18 days.

This patent is subject to a terminal disclaimer.

(21) Appl. No.: 12/861,546

(22) Filed: Aug. 23, 2010

(65) Prior Publication Data

US 2011/0042496 A1      Feb. 24, 2011

Related U.S. Application Data

(62) Division of application No. 10/415,284, filed as application No. PCT/EP01/10459 on Sep. 11, 2001, now Pat. No. 7,780,760.

(30) Foreign Application Priority Data

Oct. 27, 2000   (DE) .................................. 100 53 488

(51) Int. Cl.
B02C 17/00        (2006.01)
B02C 17/02        (2006.01)
(52) U.S. Cl. ..... 241/24.14; 241/79.1; 241/81; 241/101.2
(58) Field of Classification Search ................. 241/79.1, 241/101.2, 76, 81, 24.14
See application file for complete search history.

(56) References Cited

U.S. PATENT DOCUMENTS

| | | | |
|---|---|---|---|
| 3,848,813 A * | 11/1974 | Stanczyk et al. ................ 241/19 |
| 3,885,744 A | 5/1975 | Drage | |
| 4,033,458 A | 7/1977 | Chazen et al. | |
| 4,036,441 A | 7/1977 | Basten et al. | |
| 4,299,376 A | 11/1981 | Weiss | |
| 4,341,353 A | 7/1982 | Hamilton et al. | |
| 4,617,112 A | 10/1986 | Stout et al. | |
| 4,815,668 A * | 3/1989 | Frei ................................ 241/23 |
| 5,080,291 A | 1/1992 | Bloom | |

(Continued)

FOREIGN PATENT DOCUMENTS

DE    42 05 309      8/1993

(Continued)

OTHER PUBLICATIONS

International Search Report, International Application No. PCT/EP01/10459, dated Jan. 14, 2002.

(Continued)

*Primary Examiner* — Bena Miller
(74) *Attorney, Agent, or Firm* — Kenyon & Kenyon LLP

(57) ABSTRACT

In a method and a system for sorting shredder residues of metal-containing wastes, in particular from vehicle body shells, shredder residues are separated into a shredder light fraction and a non-ferromagnetic fraction. The method and system provide for a raw-granulate fraction being produced during the sorting of the shredder light fraction and the shredder heavy fraction in preliminary processes and a main process, by separating out at least one ferromagnetic fraction, a nonferrous-metal fraction, a fiber fraction, and a sand fraction, and the raw-granulate fraction being split up in a refining process.

10 Claims, 2 Drawing Sheets

U.S. PATENT DOCUMENTS

| | | | |
|---|---|---|---|
| 5,133,505 | A | 7/1992 | Bourcier et al. |
| 5,443,157 | A * | 8/1995 | Baker et al. ............... 209/12.1 |
| 5,535,891 | A * | 7/1996 | Kuniyone et al. ............ 209/12.1 |
| 6,070,733 | A | 6/2000 | Osing |
| 6,086,000 | A | 7/2000 | Murata |
| 6,203,595 | B1 | 3/2001 | Edlinger |
| 6,329,436 | B1 | 12/2001 | Jody et al. |
| 6,422,493 | B1 | 7/2002 | Simon et al. |
| 6,437,353 | B1 | 8/2002 | Benner |
| 6,578,783 | B2 * | 6/2003 | Simon et al. ............... 241/24.14 |
| 6,666,335 | B1 | 12/2003 | Bradley et al. |
| 2004/0251173 | A1 | 12/2004 | Goldmann et al. |
| 2004/0251335 | A1 | 12/2004 | Goldmann et al. |

FOREIGN PATENT DOCUMENTS

| | | |
|---|---|---|
| DE | 44 37 852 | 5/1996 |
| DE | 195 32 505 | 12/1996 |
| DE | 197 03 577 | 6/1998 |
| DE | 197 24 860 | 12/1998 |
| DE | 197 31 874 | 2/1999 |
| DE | 197 42 214 | 4/1999 |
| DE | 197 55 629 | 6/1999 |
| DE | 199 11 010 | 10/2000 |
| EP | 0 863 114 | 9/1998 |
| EP | 0 884 107 | 12/1998 |
| EP | 0 922 749 | 6/1999 |
| EP | 0 979 677 | 2/2000 |
| EP | 979 677 | 2/2000 |
| GB | 1 466 491 | 3/1977 |
| JP | 8-057854 | 3/1996 |
| JP | 9-194863 | 7/1997 |
| JP | 11-244838 | 9/1999 |
| JP | 2000-051830 | 2/2000 |
| JP | 2002-537992 | 11/2002 |
| WO | 98/01276 | 1/1998 |
| WO | WO 98/01276 | 1/1998 |
| WO | 00/53324 | 9/2000 |
| WO | WO 00/53324 | 9/2000 |

OTHER PUBLICATIONS

Karl-Ulrich Rudolph et al., "Stand der Behandlung und Verwertung von Shredderrueckstaenden aus Altautos," Muell und Abfall, Dec. 1997, pp. 745 to 755.

Search Report, European Application No. 06 01 7836, dated Mar. 10, 2008.

Aufbereitungs-Technik, vol. 8, Chapter 392, p. 8, 1975.

International Search Report, International Application No. PCT/EP01/10460, dated Dec. 18, 2001.

Search Report, European Application No. 100 53 487.2, dated May 31, 2001.

International Search Report, International Application No. PCT/EP01/10458, dated Feb. 15, 2002.

Search Report, European Application No. 06 01 7837, dated Mar. 10, 2008.

Rudolph et al., "*Stand der Behandlang and Verwertung von Shredderrueckstaenden aus Altautos,*" Muell and Abfall, pp. 745-755 (Dec. 1997).

Aufbereitungs-Technik, vol. 8, Ch. 392, pp. 8 (1975).

International Search Report, dated Dec. 18, 2001, issued in corresponding International Patent Application No. PCT/EP01/10460.

International Search Report, dated Feb. 15, 2002, issued in corresponding International Patent Application No. PCT/EP01/10458.

International Search Report, dated Jan. 14, 2002, issued in corresponding International Patent Application No. PCT/EP01/10459.

Search Report, dated Mar. 10, 2008, issued in corresponding European Patent Application No. 06017837.

Search Report, dated Mar. 10, 2008, issued in corresponding European Patent Application No. 06017836.

Search Report, dated May 31, 2001, issued in corresponding European Patent Application No. 10053487.2.

* cited by examiner

SYSTEM AND METHOD FOR TREATING SHREDDER RESIDUES AND USE OF A GRANULATE FRACTION THUS PRODUCED

CROSS-REFERENCE TO RELATED APPLICATION

This application is a divisional of U.S. patent application Ser. No. 10/415,284, filed on Dec. 11, 2003 now U.S. Pat. No. 7,780,760, which is a national phase of International Application No. PCT/EP2001/10459, filed on Sep. 11, 2001, which claims priority to German Patent Application Nos. 100 53 488.0, filed on Oct. 27, 2000, each of which is expressly incorporated herein in its entirety by reference thereto.

FIELD OF THE INVENTION

The present invention relates to a method for sorting shredder residues of metal-containing wastes for the purpose of producing fractions usable as materials and raw materials, and for energy and to a system that may sort the shredder residues. In addition, the present invention relates to a use of a granulate fraction, which is depleted in chlorine and metal and was separated according to the method of the present invention.

BACKGROUND INFORMATION

The shredding of old vehicles for breaking down materials has been known for a long time. In carrying out the shredding method, method controls have been established in which the material mixture produced is divided up into different fractions. Thus, a so-called shredder light fraction (SLF) is initially separated from the material mixture produced, using a suitable suction device. The remaining fraction is subsequently separated into a ferromagnetic fraction (shredder scrap (SS)) and a non-ferromagnetic fraction (shredder heavy fraction (SSF)), using a permanent-magnet separator. The portion of the shredder scrap-metal fraction that is metallurgically fully usable is often approximately 50 to 75 wt. %. Conventional designs generally provide for the shredder light fraction being disposed of as waste or burned in waste incinerators. It is characterized by both a large fraction of organics and a large fraction of fine-grained material. The heavy fraction, which is not able to fly and is not ferromagnetic, i.e., the shredder heavy fraction, is distinguished by a large percentage of nonferrous (NF) metals. Special sorting systems have been developed for recovering the different NF metals, where, however, the remaining residue of organic and inorganic, non-metallic components is generally disposed of as waste. In the following, shredder residues should be understood as all material streams from the shredding process, which cannot be directly removed at the shredder as products that are metallurgically directly utilizable (shredder scrap).

Described in German Published Patent Application No. 44 37 852 is a method, in which the shredder light fraction is sorted to remove "unwanted components", in particular copper and glass. In this context, the shredder residues are homogenized and mixed in a compulsory mixer with a fine-grained to superfine-grained material containing a magnetizable component, and the resulting mixture is conveyed through a magnetic separator. In this context, it has been shown that the metallic components of the shredder light fraction, which impede metallurgical use, may be separated out in this manner.

European Published Patent Application No. 0 863 114 provides for the production of a permanently plastic, back-filling material for mines, in that an adhesive component, a filler, and a salt solution are added to the shredder light fraction. This is intended to provide a pressure-resistant, permanently plastic body.

It is described in German Published Patent Application No. 197 42 214 that the shredder light fraction is shredded further and subjected to a thermal treatment. In this context, metallic components should be sorted out during or after shredding, and the remaining mixture of materials should be melted in a smelting reactor and converted to a "harmless" solid by cooling it.

In addition, European Published Patent Application No. 0 922 749 describes a method for processing the shredder light fraction, where the shredder light fraction is a calcined in a fluidized-bed gasifier amid the introduction of calcium carbonate.

In a further, thermal process, German Published Patent Application No. 197 31 874 provides for the shredder light fraction being compressed again in a further step, and then shredded, homogenized, and reduced in water content, in order to be thermally utilized in a subsequent step.

European Published Patent Application No. 0 884 107 provides for the shredder light fraction being converted into a metal-free fraction having a shredding size of <20 mm, by shredding, classifying, and sorting it. The sorting of the shredder light fraction should result in a thermally utilizable fraction.

In addition to the utilization methods shown, it is conventional that the shredder light fraction can be subjected to a pretreatment, in which residual ferromagnetic fractions of iron, stainless steel, and aluminum are separated. Similar methods have also been used for sorting the shredder heavy fraction. Furthermore, it is conventional that polyolefins can be separated from this fraction.

In addition, it is conventional that plastic granulates can be purified by washing off the dust adhering to the surface, and that the washed granulate can be dried again. Methods in which a granulate mixture of different plastics is split up with the aid of electrostatic separators are also conventional. In this context, differences in the specific capability of the surfaces of the individual plastic materials of being electrically charged are utilized. In particular, halogen-containing granulates such as PVC granulates can be separated from halogen-free granulates in this manner.

What the methods described above have in common is, that they are each only designed for processing the shredder light fraction, the shredder heavy fraction, or an impure granulate from other sources. Common processing with the objective of separating the shredder residues into at least partially utilizable end products to the greatest extent possible, in particular granulate fractions utilizable as raw materials, is not provided. Against the background of increasing legal requirements (EU End of Life Vehicles Directive, EU Directive on Incineration of Waste, and others), as well as increasing landfill costs and requirements for the material to be landfilled, a higher utilization rate is, however, desirable. Thus, the German regulation on end of life vehicles of Apr. 1, 1998 provides for over 95 wt. % of a scrapped car having to be utilized as of the year 2015. In addition, increased requirements from the EU Scrapped Car Guideline passed in September, 2000 specify that the fraction of material streams utilizable as materials and raw materials for mechanical and feedstock recycling should be increased to at least 85 wt. %. Therefore, utilization excludes the use as energy only, e.g., in waste incinerators. For the produced granulate fraction to be able to be used as a raw material in a blast furnace process, in the form of a reducing agent, it must be ensured, in particular, that disruptive heavy metals and chlorine-containing granulates are removed to the greatest possible extent.

It is an object of the present invention to provide a method and the system necessary for it, by which shredder residues may be processed, and by which, in addition to further end products, in particular at least one high-quality granulate fraction usable as a raw material may be produced in a mechanical sorting process.

SUMMARY

According to the present invention, this object may be achieved by providing a method for sorting shredder residues of metal-containing wastes, in particular of body shells, having the features described herein, by providing a system for sorting shredder residues having the features described herein, and by providing the use of a granulate fraction, which is produced according to the method of the present invention and has the features described herein.

The method may provide that:
(a) during the sorting of the shredder light fraction and the shredder heavy fraction in preliminary processes and a main process, a raw-granulate fraction is produced by separating out at least a ferromagnetic fraction, a fraction containing nonferrous metals, and a sand fraction; and
(b) in a refining process, the raw-granulate fraction is separated into a chlorine-enriched granulate fraction, a granulate fraction depleted in chlorine and metals, and a sludge fraction enriched with heavy metals, using the sequential process steps of surface cleaning, drying, and electrostatic separation.

This may allow high-quality fractions utilizable as raw materials, in particular a granulate fraction depleted in chlorine and metals, to be separated from the shredder residues. For example, the last-mentioned fraction may be used as a reducing agent for the blast-furnace process in the production of steel. The granulate fraction to be prepared exhibits at least the following, further characteristics:
  a fuel value of >20 MJ/kg
  a Cl content of <1.5 wt. %
  a Zn content of <0.5 wt. %
  a Cu content of <0.2 wt. %
  a Pb content of <0.1 wt. %
  a Cd content of <0.02 wt. %

It may only be possible to integrate granulate fractions from shredder residues into raw-material utilization processes in an economically sensible manner, by removing the disruptive metal and chlorine portions to the greatest possible extent. Depletion in chlorine or depletion in metals means that either the upper limits are complied with and/or the amount of chlorine and metal in this granulate is at least 50 wt. %, and in particular, 70 wt. % less than the raw granulate.

Consequently, at least one high-quality granulate fraction, a ferromagnetic fraction, a fraction containing nonferrous metals, a fibre fraction, and a sand fraction are produced as end products.

Fe, stainless steel, and Al portions broken down in a preliminary treatment may be separated from the shredder light fraction. This shredder light fraction may be:
  broken down in a first shredding unit;
  subsequently separated into at least a fraction and a non-ferromagnetic fraction, using at least one magnetic separator;
  the non-ferromagnetic fraction is broken down in a second shredding unit;
  a fine-grained sand fraction is separated from this fraction, using at least a classifier; and
  the remaining fraction is separated into a fibre fraction and a coarse-grained fraction in at least one density-separation device.

The procedure described, which includes the step-by-step breakdown of the shredder light fraction and the interposed method steps for separating out the particularly abrasive ferromagnetic components, may allow the operating costs to be kept low, in particular in the case of the second shredding unit. In addition, the desired fibre and sand end products may already be separated out at this point of the overall process control for sorting the shredder residues. A further, example embodiment provides for a cellular-plastic fraction essentially made of polyurethane being additionally separated out in the preliminary process, using a suction device.

In the preliminary process, the shredder heavy fraction may also be separated into at least an enriched fraction containing nonferrous metals, a heavy-material fraction, and a fine-grained sand fraction depleted in metals, using at least one metal separator and at least one classifier. In addition, it is possible for a high-density, residual fraction to be separated from the heavy-material fraction in at least one density-separation device. The shredder heavy fraction is separated into different material streams from the standpoint of possible, joint processing with the material streams previously produced in the preliminary process for processing the shredder light fraction.

In the main process, the material streams from the preliminary processes may be brought together in such a manner, that:
  the sand fractions are combined into a common sand fraction; and
  the heavy-material fractions are combined into a common heavy-material fraction, broken down by a shredding unit, and separated by density-separation device into the raw-granulate fraction and an enriched fraction containing nonferrous metals.

Therefore, the desired end products and intermediate products of sand, raw granulate, and the fraction containing nonferrous metals are produced in this partial process step. The fractions containing nonferrous metals may then be subjected to a treatment for separating out light-metal fractions, heavier nonferrous-metal fractions, and other metal fractions, e.g., in a common sorting step, using suitable process steps such as sand flotation and optical sorting. The nonmetallic, residual fractions produced during the separation may be resupplied to the main process and/or the preliminary processes at suitable points, as a function of amount and composition.

Among other things, the raw-granulate fraction supplied by the above-mentioned sorting processes is already a homogeneous product, i.e., components able to fly, metals, and sand have already been separated out. However, only refining allows the raw-granulate fraction to be freed of metallic dust adhering to it, and to be divided up into a granulate fraction depleted in chlorine and metals and a chlorine-enriched granulate fraction. In this context, the surface cleaning may be carried out in a friction and turbowasher, which may ensure particularly thorough separation. A washed-away sludge fraction containing nonferrous metals may be isolated and optionally fed to a separate, further treatment step not described here in further detail.

After the surface cleaning, the washed, raw-granulate fraction may be dried in a drying unit to at least a residual moisture content of <0.2 wt. %. The low residual-moisture content may be a prerequisite for the functioning of subsequent separation processes. Furthermore, it may be provided for any residual metal components still present after the drying to be separated out by a metal separator. The nonferrous-metal fractions produced at this point may be integrated into the sorting process of the fraction containing nonferrous metal, as a function of their amount and composition. The electrostatic separation may be accomplished by an electrostatic gravity separator.

Further, example embodiments of the method are described below.

Example embodiments of the system according to the present invention are described below. Regarding the aspects of the system according to the present invention, reference is made, in particular, to the above-mentioned explanations relating to the method of the present invention.

The present invention is explained below in detail in an exemplary embodiment, with reference to the corresponding drawings.

DETAILED DESCRIPTION

Figure 1:
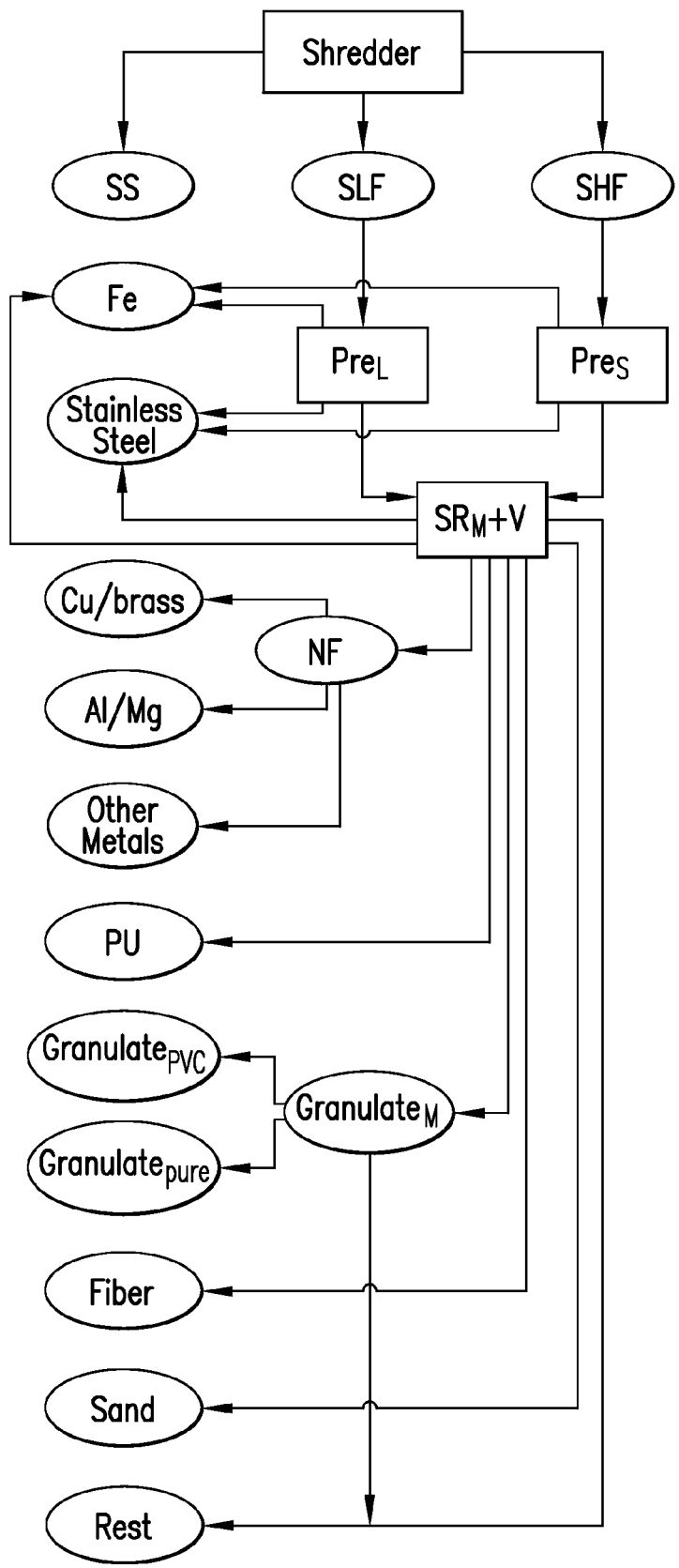
FIG. 1 is a flow diagram giving an overall view of the end products formed at specific times in the process of sorting the shredder residues.

FIG. 1 illustrates a flow chart of the times at which end products are produced according to the method of the present invention, during the sorting of the shredder residues. In an upstream shredding process, metal-containing wastes, in particular those of vehicle bodies, are initially broken down by a shredder in a shredding process. A light fraction capable of flying is subsequently separated off by a suction device (shredder light fraction SLF). After the suction, the remaining, heavy material stream not capable of flying is separated on a permanent-magnet separator, into a ferromagnetic and a non-ferromagnetic fraction. The ferromagnetic fraction is designated as shredder scrap SS and represents the primary shredder product, which may be used directly in metallurgy. The heavy, non-ferromagnetic fraction not capable of flying is referred to as shredder heavy fraction SSF. In a further pretreatment step, ferromagnetic components still present may be separated from shredder light fraction SLF by a magnetic separator. The remaining material stream of shredder light fraction SLF, as well as shredder heavy fraction SSF, are now jointly separated as shredder residues into the desired end products.

To this end, the process control provides a preliminary process $Pre_L$ for shredder light fraction SLF, a preliminary process $Pre_s$ for shredder heavy fraction SSF, a joint, main process $SR_M$, and a refining process V for final processing of at least a part of the primary material streams produced in preliminary processes $Pre_L$, $Pre_s$. According to the exemplary embodiment, fractions, which are predominantly made up of highly pure iron Fe, stainless steel, fibre, sand, chlorine-enriched granulate $Granulate_{PVC}$, granulate depleted in chlorine and metal $Granulate_{pure}$, cellular plastic PU, and a residue to remove, are formed as end products. In addition, a nonferrous-metal fraction NF may be separated out, which, in turn, appropriate process control allows to be divided up into fractions having heavier nonferrous metals, Cu/brass, light metals Al/Mg, and other metals. Except for the residual fraction, the end products formed may be used metallurgically, as materials, as raw materials, and for energy. Refining process V may be developed, in particular, from the point of view of providing a granular fraction $Granulate_{pure}$ depleted in chlorine and metal, which may be used, for example, as a reducing agent in blast-furnace processes. To this end, granulate fraction $Granulate_{pure}$ may have at least the following characteristics:

a fuel value of >20 MJ/kg
a Cl content of <1.5 wt. %
a Zn content of <0.5 wt. %
a Cu content of <0.2 wt. %
a Pb content of <0.1 wt. %
a Cd content of <0.02 wt. %

The process steps described below allow, in particular, the separation of a granulate fraction $Granulate_{pure}$ from the heterogeneous shredder residues, which meets the above-mentioned specification.

Figure 2:
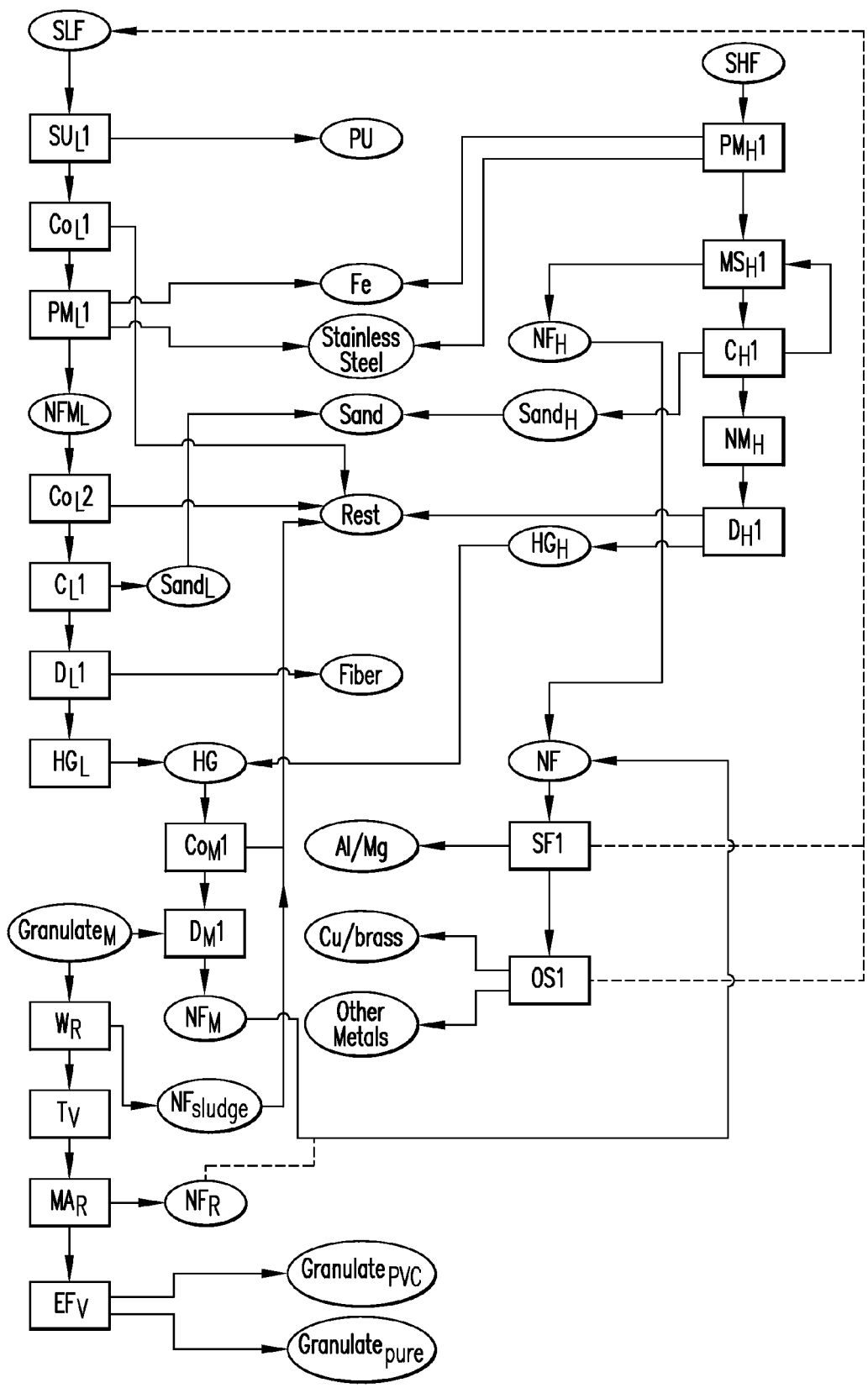
FIG. 2 is a schematic flow diagram for the process control in the preliminary sorting processes and the main sorting process.

FIG. 2 is a schematic flow diagram of components of the system for sorting the shredder residues, as well as the respective intermediate or end products produced at these components during the process control. In order to retain an overall view, the end products produced during the process are arranged in the center. Preliminary process $Pre_L$ for sorting shredder light fraction SLF is schematically represented in the upper left portion, preliminary process $Pre_s$ for sorting shredder heavy fraction SSF is represented in the upper right portion, main process $SR_M$ is illustrated in the center of the lower portion, and refining process V is represented in the lower left portion of the drawing.

Shredder heavy fraction SSF is initially subjected to two-stage Fe and stainless steel separation by permanent magnet separator $PM_H1$. After Fe and stainless steel separation, the residual stream is classified, and fractions $NF_H$ containing nonferrous metals are separated out. This may be accomplished, for example, by classification into different fractions, e.g., greater than and less than 20 mm, and by separately feeding each fraction to metal separator $MS_H1$. It is possible to have additional classification steps.

In this context, it may be provided to achieve as clean a material separation as possible into fractions $NF_H$ containing nonferrous metals, and remaining fractions $NM_H$ depleted in metals. Classifier $C_H1$ also provides for fractions $NM_H$, which are depleted in metals and have a particle diameter, e.g., <6 mm, being separated out in a sand fraction $Sand_H$.

The remaining coarse-grained fraction $NM_H$ depleted in metals is subsequently separated by a density-separation device $D_H1$ into a heavy-material fraction $HG_H$ and a high-density residual fraction Residue. This may prevent materials, which are still highly abrasive and have sharp edges, such as balls of high-grade steel, from being present in the shredding chamber during the further treatment of heavy-material fraction $HG_H$ in downstream shredding units. In addition, a metal separator may be installed at this position, in order to separate out the last solid, wear-promoting, metal contaminants. In summary, preliminary process $Pre_L$ accordingly may yield an iron fraction Fe, a stainless steel fraction, a fraction $NF_H$ containing nonferrous metals, a sand fraction $Sand_H$, and a heavy-material fraction $HG_H$.

In preliminary process $Pre_L$, a cellular-plastic fraction PU, which is predominantly made up of the polyurethane that is highly capable of flying, is initially separated from shredder light fraction SLF in suction device $SU_L1$. The separated pieces of cellular plastic are pneumatically transported into a press container, where they are automatically compressed. This fraction may be directly utilized or optionally undergo a further refining step.

The remaining fraction is now broken down in a first shredding unit $Co_L1$, and indeed in such a manner, that the discharge of unit $Co_L1$ contains particles having a diameter <50 mm. In order to keep the load on shredding unit $Co_L1$ as small as possible, a classifier may be positioned upstream from it, in order to separate out and supply a fraction having a diameter >50 mm. An iron fraction Fe and a stainless steel fraction are separated from the shredded fraction by a permanent magnet separator $PM_L1$. Remaining non-ferromagnetic fraction $NFM_L$ is now supplied to a second shredding unit $Co_L2$, in which the material is broken down further. In this context, the discharge of shredding unit $Co_L2$ is designed to be <10 mm. In this case, the infeed of shredding unit $Co_L2$ may also be limited to a fraction having a diameter >10 mm, using a classifier.

In an additional classifier $C_L1$, a fine-grained sand fraction $Sand_L$ is separated from the now effectively broken-down, non-ferromagnetic fraction $NFM_L$. The particle size of sand fraction $Sand_L$ may be set to <4 mm. The remaining fraction is subjected to air sifting and density separation in a suitable device $D_L1$. In device $D_L1$, a light fraction made up of fibre is blown over a heavy-material flap. Due to being previously transported on a vibrating conveyor, the heavier material has already settled to the bottom, so that the underlying heavy fraction automatically falls down into a heavy-material discharge (heavy-material fraction $HG_L$). In summary, the end products and intermediate products of cellular-plastic pieces PU, iron Fe, stainless steel, $Sand_L$, and heavy material $HG_L$ may be provided in preliminary process $Pre_L$. The dust and sludges containing heavy metals and organic substances are fed to residual fraction Residue during the treatment in shredding units $Co_L1$ and $Co_L2$.

In main process $SR_M$, sand fractions $Sand_L$ and $Sand_H$ are initially combined into a common sand fraction Sand. This fraction may optionally undergo a further refining step.

Heavy-material fractions $HG_L$ and $HG_H$ are also combined into a common heavy-material fraction HG. They are subsequently broken down again in a further shredding unit $Co_M1$. The discharge of shredding unit $Co_M1$ is designed to be <8 mm. Shredding unit $Co_M1$ usually takes the form of an impeller breaker, in order that the material is optimally broken down at this position. After the shredding, density separation takes place on air-settling tables (density-separation device $D_M1$). The light fraction separated off is predominantly made up of plastic in granular form. Raw granulate $Granulate_M$ is processed further in additional refining process V. Remaining, heavy fraction $NF_M$ is mostly made up of nonferrous metals, mainly copper strands. Therefore, fraction $NF_M$ may already be removed from the process at this point, or it may also be combined with heavier nonferrous-metal fraction $NF_H$ to form a common fraction NE, and be jointly sorted.

In refining process V, surface cleaning with water initially takes place in an attrition process, using a friction and turbo-washer $W_R$. In this case, dust that contains heavy metals and adheres to the surface is washed off and concentrated in a sludge fraction. This sludge fraction $NF_{sludge}$ is subjected to a separate, further treatment. The washed granulate is then dried in a drying unit TV to a residual moisture content of <0.2%. After this treatment step, an all-metal separator $MA_R$ may optionally be provided, which may separate out the last metal particles contained in the granulate, e.g., copper strands. This residual-metal fraction $NF_R$ may be fed to common nonferrous-metal processing.

The granulate pretreated in this manner is fed by a conveyor into a feed hopper of an electrostatic gravity separator $EF_v$. Here, the granules are first electrostatically (triboelectrically) charged by friction. Upon contact of the particles, some electrons are transferred per each incidence of contact, so that these are positively or negatively charged. The charging behavior of the various plastics differs according to the triboelectric series for plastics. Within this charging series, PVC is at an exposed position in comparison with a large part of the other plastics. Therefore PVC separation is possible in this manner ($Granulate_{PVC}$). In gravity separator $EF_v$, the negatively charged particles are separated from the positively charged particles as a function of the design. Chlorine-enriched granulate fraction $Granulate_{PVC}$ often has increased lead and cadmium values. These two heavy metals are often used as stabilizers/plastic additives, particularly in PVC. In addition, one obtains a granulate fraction $Granulate_{pure}$ depleted in chlorine and metals.

The fraction NE containing nonferrous metals may essentially be sorted by a sand flotation system SF1 and an optical sorter OS1. Sand flotation allows a light-metal fraction predominantly made up of aluminum and magnesium to be separated from a heavy-metal fraction in a dry mechanical manner. It may be noted that the sand used here as a separation medium has nothing to do with the fraction "Sand" separated from the shredder residues. The heavy metals sink into the sand bed, while the light metals float on the sand bed. An upper stream containing light metals and the lower screen enriched with the heavy metals are separated by a separating partition. The metal concentrates are separated from the separating medium, Sand, again in a process step belonging to sand flotation. Separated aluminum and magnesium fraction Al/Mg may optionally be separated to a further extent.

The separated heavy fraction (in particular zinc Zn, copper Cu, brass, lead Pb, and possibly V4A steel) is separated into the nonferrous metals copper/brass, as well as other metals, using optical sorter OS1. Depending on the amount and composition, any nonmetallic residues produced may be fed in at a suitable position, such as, in this case, into preliminary process $Pre_L$. In summary, an Al/Mg fraction, a Cu/brass fraction, a fraction having other metals, a sand friction Sand, and a raw-granulate fraction $Granulate_M$ are provided in the main process $SR_M$ having subsequent nonferrous-metal separation. Raw-granulate fraction $Granulate_M$ is then further cleaned up in refining process V, so that chlorine-enriched granulate fraction $Granulate_{PVC}$ and the granulate fraction $Granulate_{pure}$ depleted in chlorine and metals are produced.

LIST OF REFERENCE NUMERALS $SU_L1$ Suction device (separation of cellular-plastic fraction)
Al/Mg light-metal fraction
Cu/brass heavier nonferrous metal fraction
$D_M1$, $D_L1$, $D_H1$ density-separation devices
$EF_v$ electrostatic gravity separator
Fe iron fraction
Fibre fibre fraction
$Granulate_M$ raw-granulate fraction
$Granulate_{PVC}$ chlorine-enriched granulate fraction
$Granulate_{pure}$ granulate fraction depleted in chlorine and metals
$C_L1$, $C_H1$ classifiers
$MS_H1$, $MA_R$ metal separator/all-metal separator
NE, $NF_M$, $NF_L$, $NF_H$,
$Nf_{sludge}$, $NF_R$ fractions containing nonferrous metals
$NFM_L$ non-ferromagnetic fraction
$NM_H$ fraction depleted in metals
OS1 optical sorter
$PM_L1$, $PM_H1$ permanent-magnet separator
PU cellular-plastic fraction
Residue residual fraction
Sand, $Sand_L$, $Sand_H$ sand fractions
SF1 sand flotation system
HG, $HG_L$, $HG_H$ heavy-material fractions
SLF shredder light fraction other metals fraction having other metals
SR_M main process
SS shredder scrap
SSF shredder heavy fraction
V refining process for the granulate
Pre_L preliminary process for the shredder light fraction
Pre_S preliminary process for the shredder heavy fraction
W_R friction and turbowasher
Co_L1, Co_L2, Co_M1 shredding units

What is claimed is:

1. A system for sorting shredder residues of a metal-containing waste, the shredder residues including a light shredder fraction and a non-ferromagnetic fraction, comprising:
   an arrangement configured to produce during sorting of the light shredder fraction and the non-ferromagnetic fraction a raw-granulate fraction in preliminary processes and a main process by separation out of at least a ferromagnetic fraction, a fraction containing nonferrous metals, a lint fraction and a sand fraction; and
   an arrangement configured to separate in a refining process the raw-granulate fraction into at least a chlorine-enriched granulate fraction, a granulate fraction lacking in chlorine and metals and a sludge fraction enriched with heavy metals in accordance with subsequent surface cleaning, drying and electrostatic separation.

2. The system according to claim 1, further comprising a magnetic separator configured to separate residual ferromagnetic fractions from the light shredder fraction.

3. The system according to claim 1, wherein to process a pre-treated light shredder fraction, the system further comprises in succession in the preliminary process:
   a first shredding unit configured to break down the light shredder fraction;
   at least one magnetic separator configured to separate at least one ferromagnetic fraction from a non-ferromagnetic fraction;
   a second shredding unit configured to break down the non-ferromagnetic fraction;
   at least one classifier configured to separate out a fine-grained sand fraction; and
   at least one density-separation device configured to separate a remaining fraction into a lint fraction and a coarse-grained, heavy-material fraction.

4. The system according to claim 3, further comprising a suction device configured to separate out a cellular-plastic fraction.

5. The system according to claim 1, wherein to process the non-ferromagnetic fraction in the preliminary process, the system further comprises a metal separator and at least one classifier in succession configured to separate out at least one enriched fraction containing nonferrous metals, a heavy-material fraction and a fine-grained sand fraction lacking in metals.

6. The system according to claim 1, wherein in the main process and configured to process material steams from the preliminary process, the system further comprises:
   an arrangement configured to combine heavy-material fractions into a common heavy-material fraction;
   a shredding unit configured to break down the common heavy-material fraction; and
   a subsequent density-separation device configured to separate the raw-granulate fraction and an enriched fraction containing non-ferrous metals from the broken-down common heavy-material fraction.

7. The system according to claim 1, wherein the arrangement configured to separate the raw-granulate fraction in the refining process includes at least one friction and turbowasher, a drying unit and an electrostatic gravity separator.

8. The system according to claim 7, further comprising a metal separator.

9. The system according to claim 8, further comprising an arrangement configured to feed a nonferrous metal fraction provided during separation in the refining process into a sorting process of the fraction containing nonferrous metals.

10. A system for sorting shredder residues of a metal-containing waste that includes waste of a body shell, the shredder residues including a light shredder fraction and a non-ferromagnetic fraction, comprising:
   an arrangement configured to produce during sorting of the light shredder fraction and the non-ferromagnetic fraction a raw-qranulate fraction in preliminary processes and a main process by separation out of at least a ferromagnetic fraction, a fraction containing nonferrous metals, a lint fraction and a sand fraction; and
   an arrangement configured to separate in a refining process the raw-granulate fraction into at least a chlorine-enriched granulate fraction, a granulate fraction lacking in chlorine and metals and a sludge fraction enriched with heavy metals in accordance with subsequent surface cleaning, drying and electrostatic separation.

* * * * *